United States Patent [19]
Inoue et al.

[11] Patent Number: 5,988,767
[45] Date of Patent: Nov. 23, 1999

[54] HYDRAULIC BRAKING PRESSURE CONTROL APPARATUS FOR AN AUTOMOTIVE VEHICLE

[75] Inventors: Takehiro Inoue, Toyota; Hiroyuki Kondo, Anjo; Toshiya Shibata, Kariya; Kaoru Nakamura, Anjo, all of Japan

[73] Assignee: Aisin Seiki Kabushiki Kaisha, Kariya, Japan

[21] Appl. No.: 08/900,463

[22] Filed: Jul. 25, 1997

[51] Int. Cl.$^6$ ....................................................... B60T 8/32
[52] U.S. Cl. .................................. 303/113.1; 303/116.4; 303/DIG. 10
[58] Field of Search ............................... 303/116.4, 114.2, 303/114.3, 113.1, 119.2, 119.3, 113.3, 116.1, DIG. 10, DIG. 11; 60/545

[56] References Cited

U.S. PATENT DOCUMENTS

| | | | |
|---|---|---|---|
| 4,597,611 | 7/1986 | Nishimura et al. | 303/116.4 |
| 4,796,958 | 1/1989 | Brown, Jr. | 303/113.1 |
| 4,998,781 | 3/1991 | Kehl et al. | 303/116.4 |
| 5,011,238 | 4/1991 | Brown, Jr. | 303/113.2 |
| 5,072,996 | 12/1991 | Heibel et al. | 303/114.3 |
| 5,236,257 | 8/1993 | Monzaki et al. | 303/114.2 |
| 5,607,207 | 3/1997 | Nagashima et al. | 303/113.1 |

FOREIGN PATENT DOCUMENTS

| | | |
|---|---|---|
| 8-11696 | 1/1996 | Japan . |
| 8-11697 | 1/1996 | Japan . |

*Primary Examiner*—Robert J. Oberleitner
*Assistant Examiner*—Thomas J. Williams
*Attorney, Agent, or Firm*—Burns, Doane, Swecker & Mathis, LLP

[57] ABSTRACT

A hydraulic braking pressure control apparatus for an automotive vehicle includes a master cylinder mounted on a brake booster for applying a braking force, a master cylinder reservoir provided on the master cylinder for supplying hydraulic fluid to the master cylinder, and a solenoid valve body mounted on the master cylinder. The solenoid valve body includes a plurality of solenoid valves and a fluid circuit operatively connected to the master cylinder for generating a braking pressure to be supplied to wheel brake cylinders. A pump body is mounted on the master cylinder and includes a pump device for returning hydraulic fluid to the master cylinder and the solenoid valve body. A pump motor drives the pump device, with the pump motor being mounted on the master cylinder and being symmetrically disposed with respect to the solenoid valve body.

7 Claims, 7 Drawing Sheets

HYDRAULIC BRAKING PRESSURE CONTROL APPARATUS FOR AN AUTOMOTIVE VEHICLE

FIELD OF THE INVENTION

The present invention generally relates to braking systems. More particularly, the present invention pertains to a hydraulic braking pressure control apparatus for an automotive vehicle of the type having a brake master cylinder, an anti-lock brake system (ABS) actuator and a traction control system (TRC) actuator.

BACKGROUND OF THE INVENTION

A known type of hydraulic braking pressure control apparatus for an automotive vehicle is described in Japanese Patent Laid-Open Patent Application No. 8-11696. The hydraulic braking pressure control apparatus is of the type that includes a master cylinder integrally provided with an ABS actuator or both an ABS actuator and a TRC actuator. In this conventional braking pressure control apparatus, all the component parts of the actuators including the reservoir, the pump motor and the pump body are integrally assembled with the cylinder body of the master cylinder or are separately mounted on the cylinder body of the master cylinder. The pump motor in particular is mounted on the cylinder body sideways.

This type of conventional hydraulic braking pressure control apparatus suffers from a variety of drawbacks and disadvantages. In one respect, when the actuator assembly is mounted on the cylinder body of the master cylinder, a relatively large space is occupied by the actuator assembly. This makes the overall size of the hydraulic braking pressure control apparatus undesirably large. In addition, the center of gravity of the control apparatus is shifted to one side due to the weight of the actuator assemblies and the pump motor. As a result, difficulties arise in mounting the control apparatus to a vehicle body structure. Additionally, a firm support structure is required to support the control apparatus and prevent vibration. Further, if the component parts of the actuator are separately mounted on the cylinder body of the master cylinder, it is necessary to provide mounting portions on the cylinder body for the respective component parts. This means that different kinds of cylinder bodies are required to accommodate different kinds of actuators, thus undesirably increasing the cost associated with manufacturing the hydraulic braking pressure control apparatus.

SUMMARY OF THE INVENTION

In light of the foregoing, a need exists for an improved hydraulic pressure control system that is at least able to overcome the drawbacks and disadvantages associated with conventional hydraulic braking pressure control apparatus.

In particular, a need exists for a hydraulic braking pressure control apparatus that is able to withstand vibration and resonation without the need for a firm support structure.

A need also exists for a hydraulic braking pressure control apparatus that is relatively small in size.

It would also be desirable to provide a hydraulic braking pressure control apparatus in which difficulties associated with the mounting of the control apparatus on the vehicle body are minimized.

It would be further desirable to provide a hydraulic braking pressure control apparatus which does not require different kinds of cylinder bodies to accommodate different kinds of actuators.

In accordance with one aspect of the present invention, a hydraulic braking pressure control apparatus includes a master cylinder mounted on a brake booster for applying a braking force, and a master cylinder reservoir provided on the master cylinder for supplying hydraulic fluid to the master cylinder. A solenoid valve body is mounted on the master cylinder and includes a plurality of solenoid valves and a fluid circuit operatively connected to the master cylinder for supplying braking pressure to a plurality of wheel brake cylinders. A pump body is mounted on the master cylinder and includes a pump device for returning hydraulic fluid to the master cylinder and the solenoid valve body, and a pump motor is provided to drive the pump device. The pump motor is mounted on the master cylinder and is substantially symmetrically disposed with respect to the solenoid valve body.

According to another aspect of the present invention, a hydraulic braking pressure control apparatus for an automotive vehicle includes a master cylinder mounted on a brake booster for applying a braking force, a master cylinder reservoir provided on the master cylinder for supplying hydraulic fluid to the master cylinder, and a solenoid valve body mounted on the master cylinder. The solenoid valve body includes a plurality of solenoid valves and a fluid circuit operatively connected to the master cylinder for generating a braking pressure to be supplied to wheel brake cylinders. A pump body is mounted on the master cylinder and includes a pump device for returning hydraulic fluid to the master cylinder and the solenoid valve body. A pump motor is also provided for driving the pump device. The pump motor possesses a drive axis that is oriented substantially parallel to a central axis of the hydraulic braking pressure control apparatus.

In accordance with another aspect of the invention, a hydraulic braking pressure control apparatus for an automotive vehicle includes a master cylinder that applies a braking force and a master cylinder reservoir mounted on the master cylinder for supplying hydraulic fluid to the master cylinder. The master cylinder is mounted on a brake booster at two spaced apart support portions. A solenoid valve body is mounted on the master cylinder and includes a plurality of solenoid valves and a fluid circuit operatively connected to the master cylinder for generating a braking pressure to be supplied to wheel brake cylinders. A pump body is mounted on the master cylinder and includes a pump device for returning hydraulic fluid to the master cylinder and the solenoid valve body. A pump motor drives the pump device and possesses a drive axis that extends between the two spaced apart support portions.

BRIEF DESCRIPTION OF THE DRAWING FIGURES

Additional details and features associated with the present invention will become more apparent from the following detailed description considered with reference to the accompanying drawing figures in which like elements are designated by like reference numerals and wherein.

DETAILED DESCRIPTION OF A PREFERRED EMBODIMENT

Figure 1:
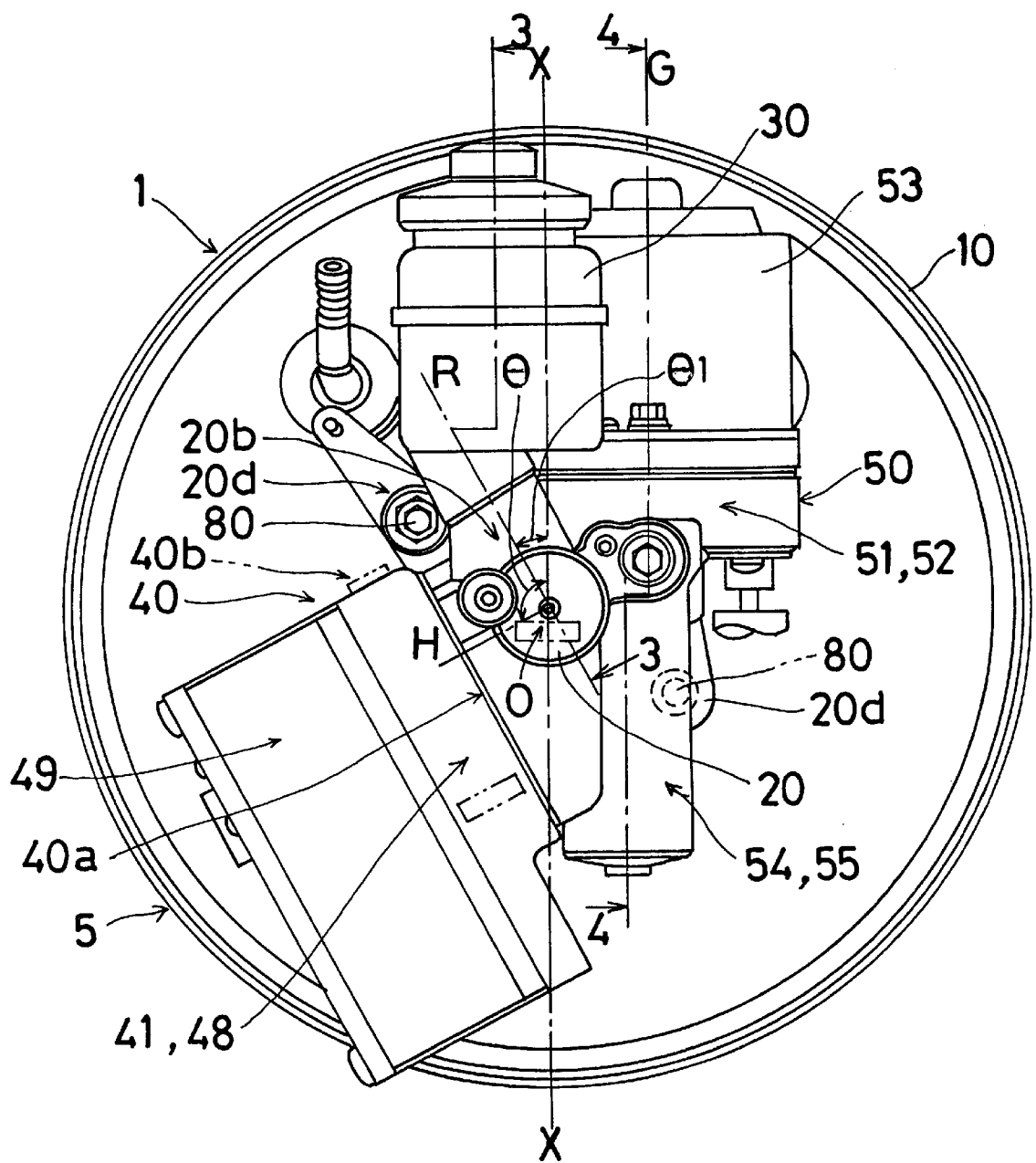
FIG. 1 is a front view of a hydraulic braking pressure control apparatus of the present invention.
Figure 2:
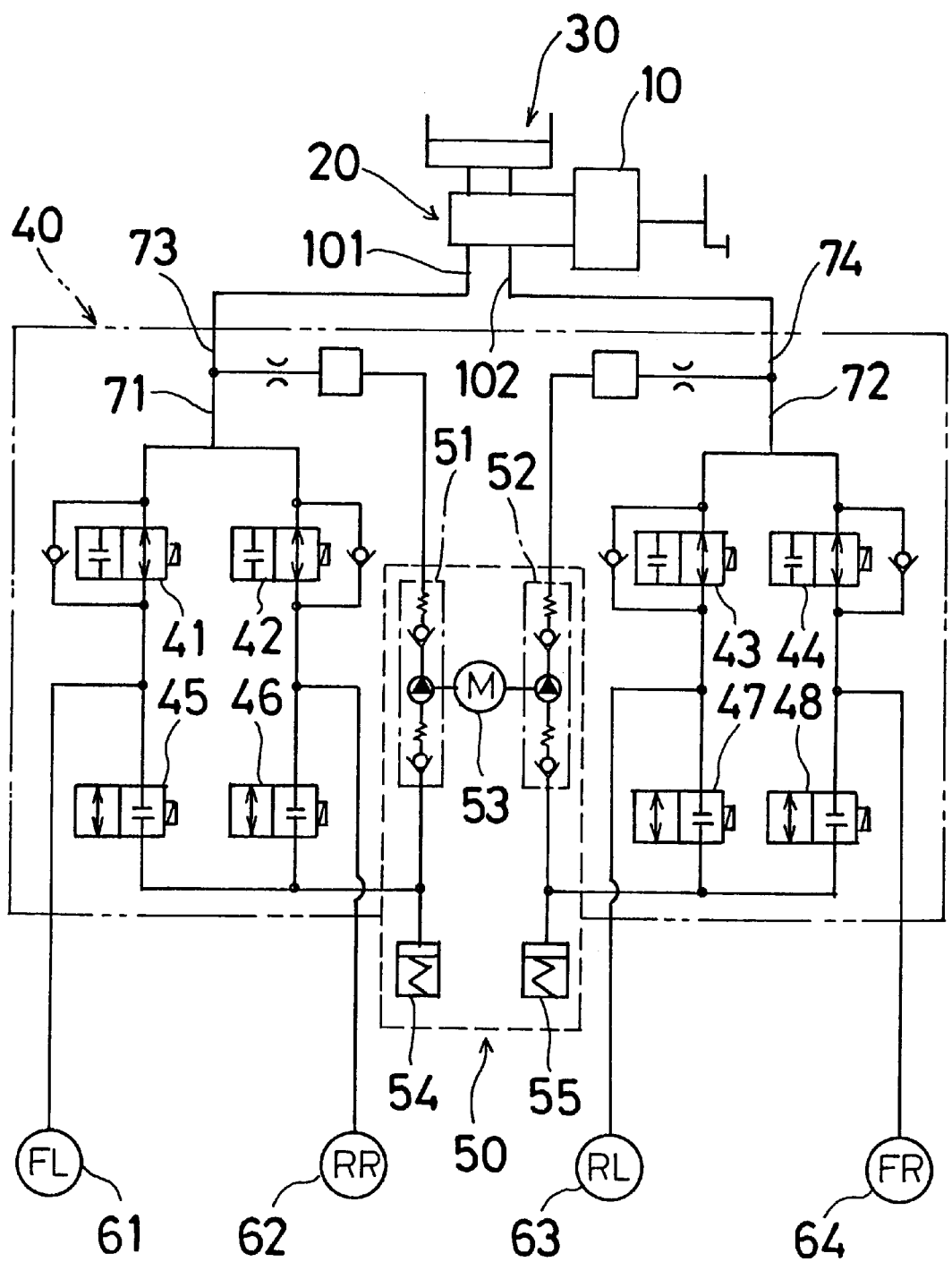
FIG. 2 is a block diagram of the hydraulic pressure control circuit according to the present invention.
Figure 6:
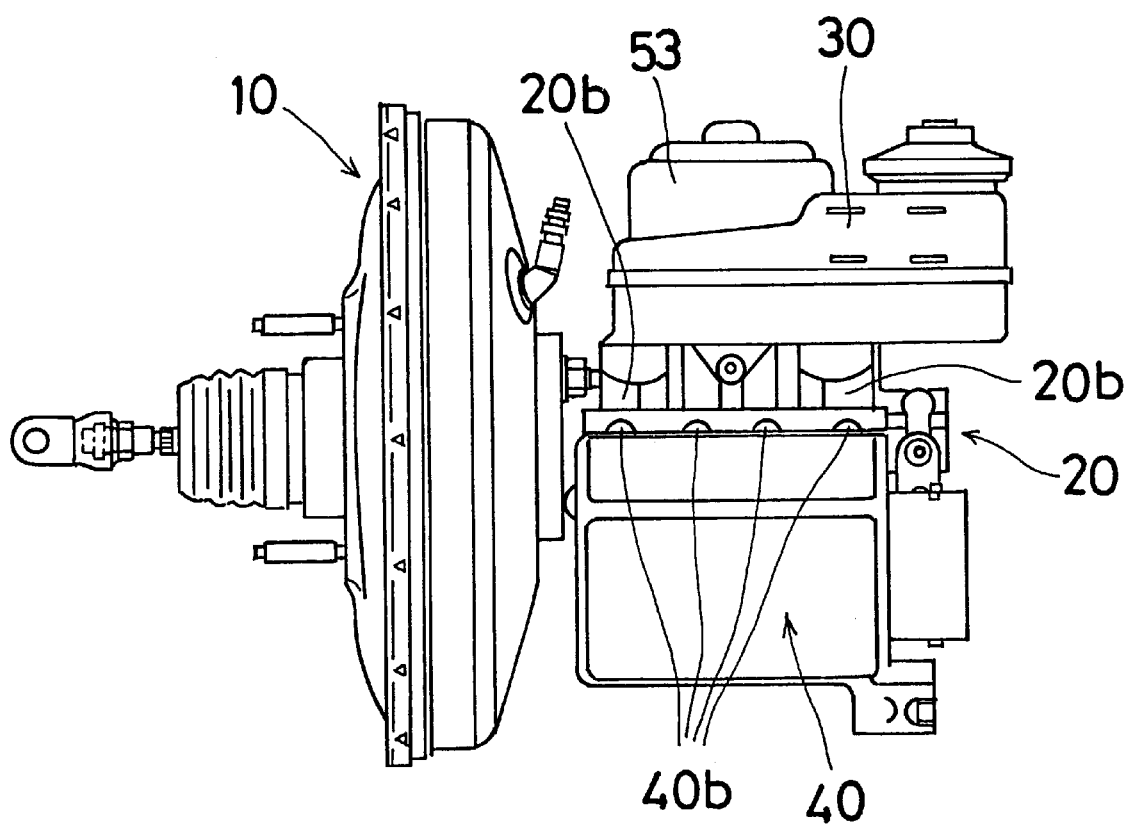
FIG. 6 is a side view of the hydraulic braking pressure control apparatus of the present invention.

With reference initially to FIGS. 1 and 6, the hydraulic braking pressure control apparatus 1 in accordance with the present invention includes a vacuum type brake booster 10 mounted on a dashboard panel (not shown) of a vehicle body, a tandem master cylinder 20 assembled with the brake booster 10, a master cylinder reservoir 30 integrally mounted on the master cylinder 20, a solenoid valve body 40 mounted on the master cylinder 20 to provide the hydraulic braking pressure control circuit shown in FIG. 2, and a pump body 50 integrally mounted on the master cylinder 20. The mounting of the master cylinder reservoir 30 on the master cylinder 20 can be seen in FIG. 3. The brake booster 10 is a vacuum type brake booster that is designed to provide pressure to the master cylinder 20.

Figure 3:
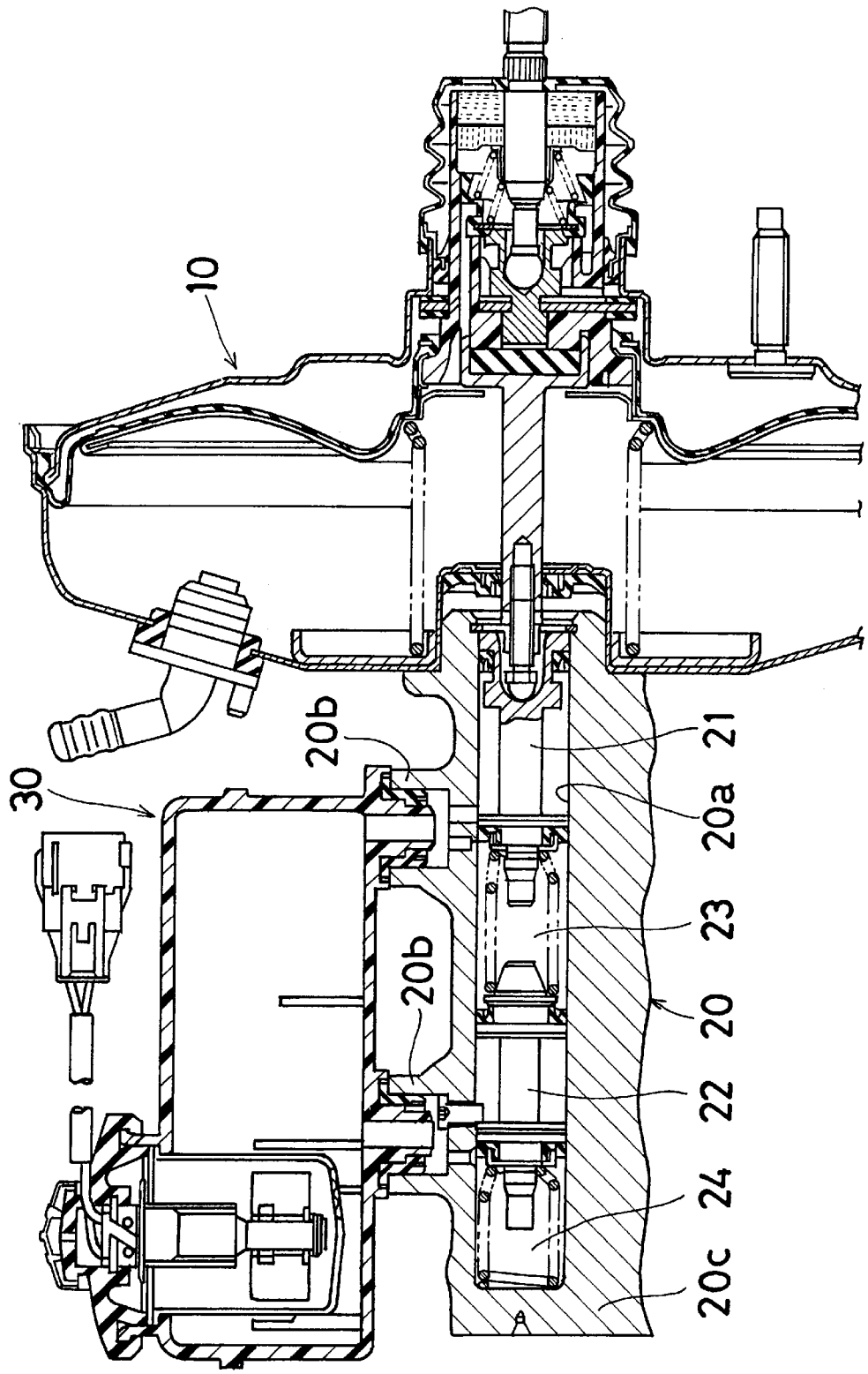
FIG. 3 is a cross-sectional view of the hydraulic braking pressure control apparatus of the present invention taken along the section line 3—3 in FIG. 1.

As shown in FIGS. 1–3, the tandem type master cylinder 20 has a cylinder body 20c and a pair of axially spaced pistons 21, 22 disposed within an axial bore 20a of the cylinder body 20c. The two pistons 21, 22 form two pressure chambers 23, 24 within the axial bore 20a. Each of the pressure chambers 23, 24 communicates with a respective fluid path 101, 102 formed in the cylinder body 20c.

Figure 5:
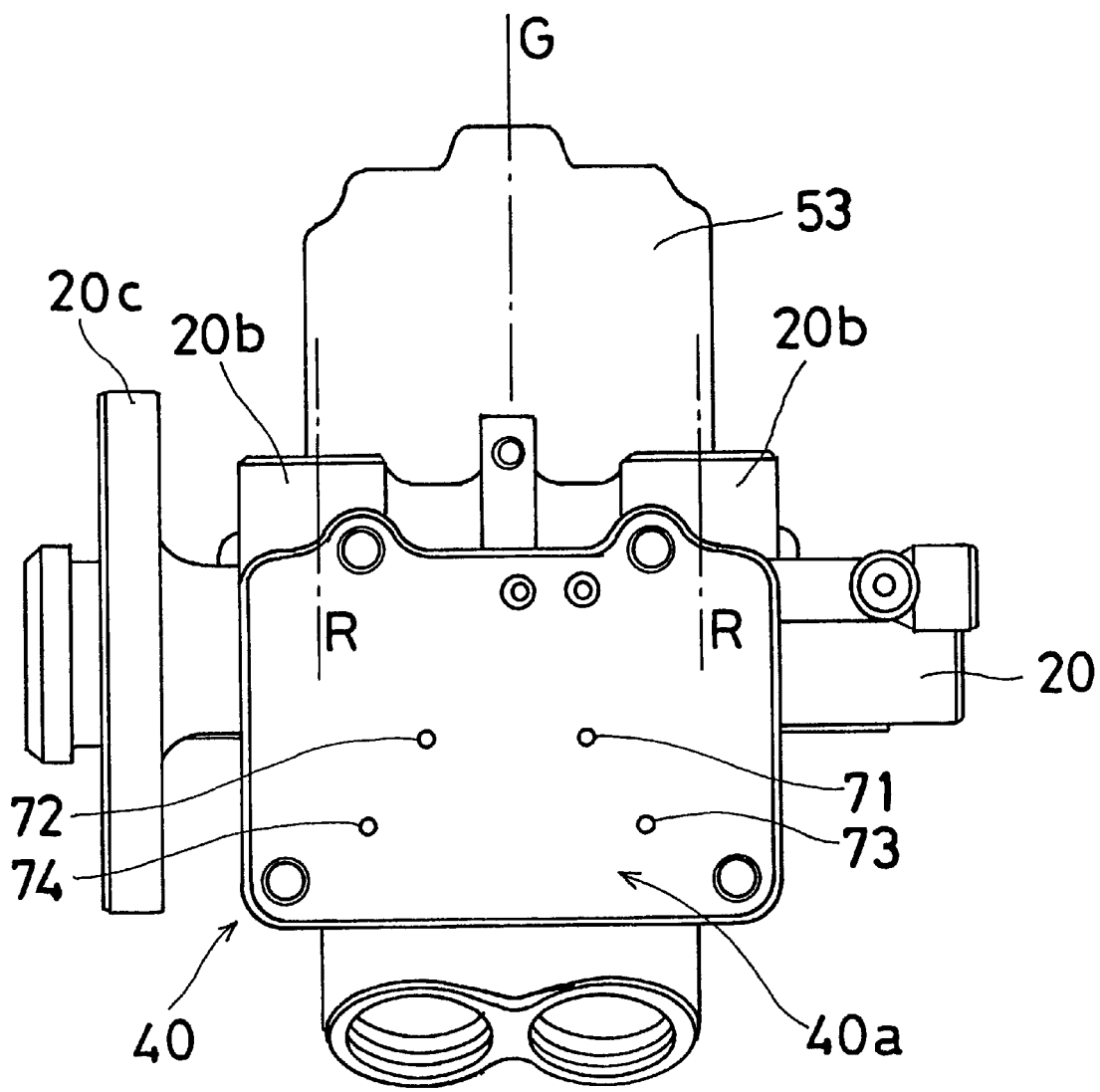
FIG. 5 is a plan view of the hydraulic braking pressure control apparatus of the present invention as seen from the direction of the arrow 5 in FIG. 1.

The solenoid valve body 40 possesses a fitting surface 40a as seen in FIG. 5. In addition, the solenoid valve body 40 includes fluid paths 71, 72 shown in FIG. 2, a plurality of solenoid valves 41, 42, 43, 44, 45, 46, 47, 48 to control hydraulic braking pressure, and an electric control unit (ECU) 49. The fluid path 71 communicates with a pair of wheel brake cylinders 61, 62 associated with the front left and rear right wheels of the vehicle while the fluid path 72 communicates with a pair of wheel brake cylinders 63, 64 associated with the rear left and rear left wheels of the vehicle. The ECU controls the operating condition of the solenoid valves 41, 42, 43, 44, 45, 46, 47, 48.

Figure 4:
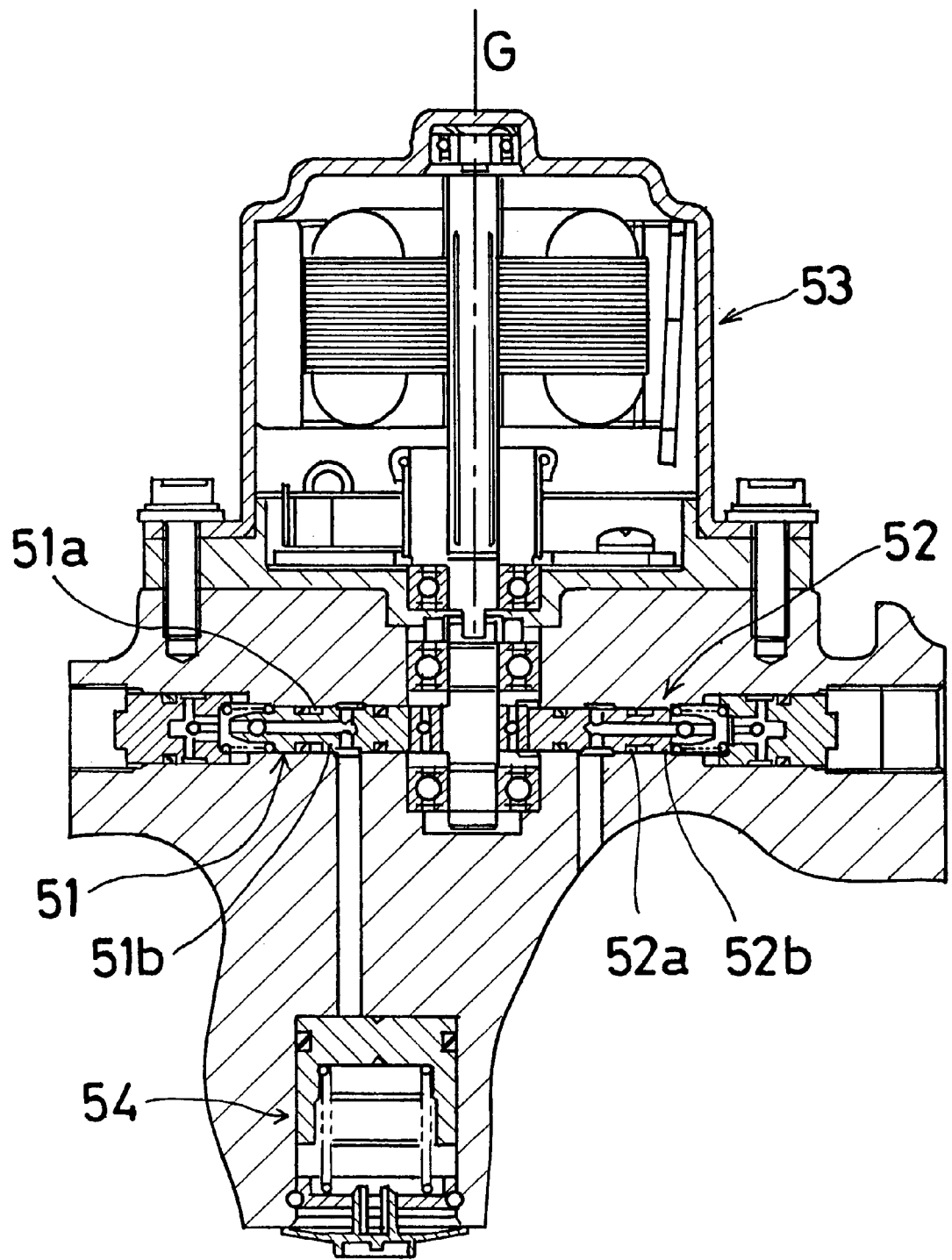
FIG. 4 is a cross-sectional view of the hydraulic braking pressure control apparatus of the present invention taken along the section line 4—4 in FIG. 1.

As seen with reference to FIGS. 1, 2 and 4, the pump body 50 includes a fluid path, a pair of plunger type pump devices 51, 52, a pump motor 53 operatively associated with the pump devices 51, 52 to operate the pump devices 51, 52, and a pair of reservoirs 54, 55 which are in communication with the wheel brake cylinders 61, 62, 63, 64. The ECU 49 controls the operating condition of the pump motor 53.

Figure 7:
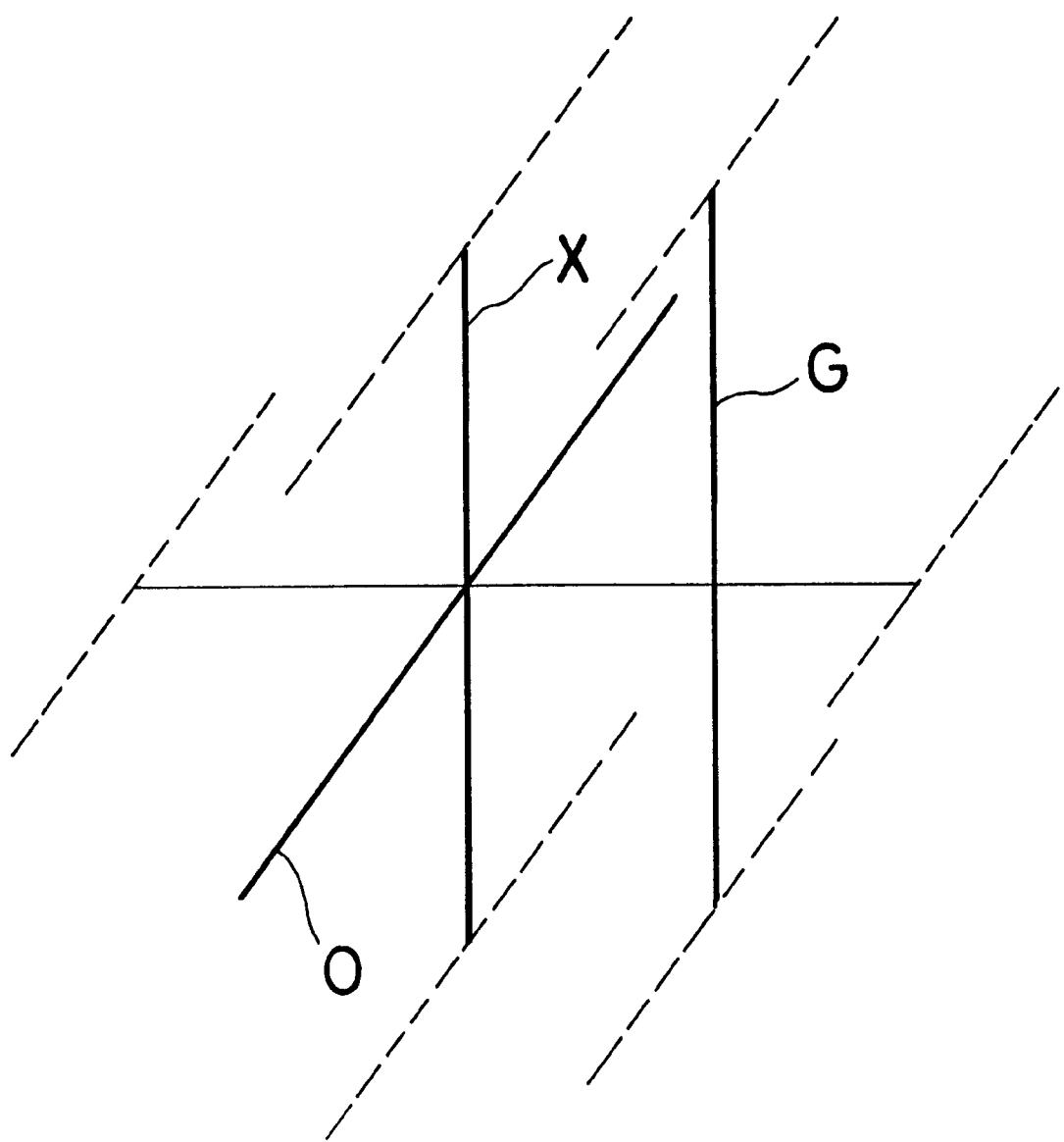
FIG. 7 is an illustration of the relative orientation of axes of various parts of the hydraulic braking pressure control apparatus of the present invention.

As shown in FIGS. 1 and 3, the master cylinder reservoir 30 is integrally assembled with the upper portion of the master cylinder 20 in a fluid-tight manner, while the pump body 50 is integrally assembled with the right side of the cylinder body 20c. The pump motor 53 is arranged in a lengthwise manner next to or adjacent the reservoir 30 on the upper portion of the cylinder body 20c. The drive axis G of the pump motor 53 and the axis O of the master cylinder 20 are oriented in such a way that a horizontal plane containing the axis O is perpendicularly oriented relative to a vertical plane containing the drive axis G as seen in FIG. 7. Further, the drive axis G of the pump motor 53 is parallel to the central axis X of the hydraulic braking pressure control apparatus. Also, the central axis X is perpendicular to the axis O. The central axis X of the hydraulic braking pressure control apparatus is the vertical axis that extends through the center point of the apparatus when the apparatus is oriented in the manner shown in FIG. 1. The illustration in FIG. 7 depicts the relationship and relative orientation of the drive axis G, the control axis X and the axis O.

As seen in FIGS. 1 and 6, the solenoid valve body 40 is assembled to the underside or under surface portion of the master cylinder 20. A predetermined angle θ is defined between the central axis X of the hydraulic braking pressure control apparatus and the solenoid valve body 40. More specifically, the normal line H of the solenoid valve body 40, which represents the line H that extends normal or perpendicular to the fitting surface 40a and that crosses the axis O, and the central axis X form the predetermined angle θ. The angle θ is designed to be between about 105 degrees and 135 degrees. Therefore, the pump body 50 and the pump motor 53 are arranged at the upper right portion of the braking pressure control apparatus as seen with reference to FIG. 1 while the solenoid valve body 40 is arranged at the lower left portion of the braking pressure control apparatus as seen with reference to FIG. 1.

With reference to FIGS. 1, 3, 5 and 6, the master cylinder 20 is provided with two reservoir inlets 20b to communicate with the reservoir 30. The reservoir inlets 20b are positioned and oriented so that the central axis R of each of the reservoir inlets 20b forms a predetermined angle $\theta_1$ with the central axis X. As seen in FIG. 5, the pump motor 53 and the master cylinder 20 are arranged so that the drive axis G of the pump motor 53 lies between the central axes R of the respective reservoir inlets 20b, 20b when viewed from the direction of arrow 5 in FIG. 1 (i.e., from the side).

As seen with reference to FIG. 4, the pump devices 51, 52 include plunger cylinders 51a, 52a. The plunger cylinders 51a, 52a of the pump devices 51, 52 are disposed parallel to the cylinder portion 20a. The pump plungers 51b, 52b in the plunger cylinders 51a, 52a are symmetrically disposed on opposite sides with respect to the drive axis G of the pump motor 53.

The fluid paths 71, 72 are formed in the fitting surface 40a of the solenoid valve body 40. High pressurized fluid pressure, which is generated in the pump devices 51, 52, passes thorough the fluid paths 71, 72. Further, fluid drain paths 73, 74 are formed in the fitting surface 40a of the solenoid valve body 40 as shown in FIG. 5.

The hydraulic braking pressure control apparatus 1 is tightly mounted on the brake booster 10 by way of a pair of bolts 80, 80, and a pair of fixed portions 20d, 20d. The drive axis G of the pump motor 53 lies between the two fixed portion 20d, 20d. Moreover, the two fixed portion 20d, 20d are symmetric with respect to the line extending between the solenoid valve body 40 and the pump motor 53. Four outlet ports 40b which communicate with the wheel brake cylinders 61, 62, 63, 64 are formed between the center axis X and the normal line H of the solenoid valve body 40.

During the operating mode of the hydraulic braking pressure control apparatus 1, the ECU 49 controls the solenoid valves 41, 42, 43, 44, 45, 46, 47, 48, and the pump motor 53 based on wheel speed signals received from wheel speed sensors. By energizing and de-energizing the solenoid valves 41, 42, 43, 44, 45, 46, 47, 48, the hydraulic braking pressure in the wheel brake cylinders 61, 62, 63, 64 is decreased, held or increased. The pump motor 53 drives the pump devices 51, 52 during the ABS control condition.

When current is not supplied to the solenoid valves 41, 42, 43, 44, 45, 46, 47, 48, hydraulic braking pressure is supplied from the master cylinder 20 to each of the wheel brake cylinders 61, 62, 63, 64 to increase the hydraulic braking pressure in each wheel brake cylinder. On the other hand, when current is supplied to the solenoid valves 41, 44, 45, 48, each of the wheel brake cylinders 61, 64 is communicated with the respective reservoir 54, 55 to decrease the hydraulic baking pressure in such wheel brake cylinders 61, 64. Further, when current is supplied only to the solenoid valves 41, 44, the hydraulic braking pressure in each wheel brake cylinder is held and when current is not supplied to the solenoid valves 41, 44, 45, 48 the hydraulic braking pressure in each wheel brake cylinder is increased. The brake fluid is discharged from the reservoirs 54, 55 to the master cylinder 20 according to the operation of the pump device 51, 52.

As can be appreciated from the foregoing description, the distance defined between the center of gravity of the pump motor 53 and the center axis X is reduced because the pump motor 53 is disposed so that the drive axis G of the pump motor 53 and the central axis X are oriented parallel to each other as seen in FIG. 7. When a vibration force is applied to the pump motor 53, the load force to the pump motor 53 can be reduced and so it is not necessary to improve the firm support structure at the fixed portions 20*d*, 20*d*.

In addition, the distance between the center of gravity of the pump motor 53 and the center axis X is reduced because the drive axis G is located between the fixed portions 20*d*, 20*d*. As a result, the load force to the pump motor 53 is advantageously reduced.

Based upon the positioning relationship between the pump body 50 and the solenoid valve body 40, the weight allocation of the pump body 50 and the solenoid valve body 40 can be spread out so that the resulting center of gravity of the hydraulic braking pressure control apparatus is not disposed to one side to the same extent as in conventional devices of this type. Therefore, it is not necessary to increase the strength of the fixed portions 20*d*, 20*d*. As seen with reference to FIG. 1, the pump body 50 and the solenoid valve body 40 are symmetrically or substantially symmetrically disposed with respect to the central axis X in that the pump body 50 is positioned at the upper right portion of the apparatus whereas the solenoid valve body 40 is positioned diagonally with respect to the pump body 50 in the lower left portion of the apparatus.

Additionally because the normal line H of the solenoid valve body 40 and the central axis X form the predetermined angle θ, and the outlet ports 40*b* are formed above the solenoid valve body 40, an easily assembled structure is provided.

Because of the positioning relationship between the pump motor 53 and the solenoid valve body 40, an easy assembled structure for the master cylinder 20 is also provided.

By virtue of the present invention, it is possible to make the hydraulic braking pressure control apparatus relatively small in size and weight. Also, because the component parts of the pump motor 53, the pump body 50, the reservoir 30 and the solenoid valve body 40 are mounted around the master cylinder 20, the weight of the hydraulic braking pressure control apparatus is better balanced. As a result, the support structure of the hydraulic braking pressure control apparatus can be simplified and the need for increasing the strength of the fixed portions 20*d*, 20*d* is eliminated. Additionally, the present invention permits realization of cost reduction with respect to manufacturing the hydraulic braking pressure control apparatus.

The principles, a preferred embodiment and modes of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic braking pressure control apparatus for an automotive vehicle comprising:

a master cylinder mounted on a brake booster for applying a braking force;

a master cylinder reservoir provided vertically on top of said master cylinder for supplying hydraulic fluid to said master cylinder;

a solenoid valve body mounted on the master cylinder, the solenoid valve body including a plurality of solenoid valves and a fluid circuit operatively connected to said master cylinder for generating a braking pressure to be supplied to wheel brake cylinders;

a pump body mounted on the master cylinder, the pump body including a pump device for returning hydraulic fluid to said master cylinder and said solenoid valve body; and a pump motor for driving said pump device, said pump motor being mounted vertically on top of said master cylinder and adjoining said master cylinder reservoir, said pump motor having an axis which extends perpendicularly to an axis of said master cylinder without crossing said axis of said master cylinder.

2. A hydraulic braking pressure control apparatus for an automotive vehicle as set forth in claim 1, wherein said master cylinder is supported on said brake booster at two spaced apart support portions.

3. A hydraulic braking pressure control apparatus for an automotive vehicle as set forth in claim 2, wherein the pump motor has a drive axis that passes between said two support portions.

4. A hydraulic braking pressure control apparatus for an automotive vehicle as set forth in claim 1, wherein said hydraulic braking pressure control apparatus includes a center axis that is transversely disposed with respect to said solenoid valve body.

5. A hydraulic braking pressure control apparatus for an automotive vehicle as set forth in claim 4, wherein the center axis of the hydraulic braking pressure control apparatus forms an angle between 105° and 135° with the solenoid valve body.

6. A hydraulic braking pressure control apparatus for an automotive vehicle as set forth in claim 5, including a plurality of reservoir inlets provided on the master cylinder reservoir, said reservoir inlets being provided within said angle.

7. A hydraulic braking pressure control apparatus for an automotive vehicle as set forth in claim 6, wherein the pump motor has a drive axis and each of the reservoir inlets has a central axis, the drive axis being located between the central axes of the reservoir inlets.

* * * * *

UNITED STATES PATENT AND TRADEMARK OFFICE
CERTIFICATE OF CORRECTION

PATENT NO.  : 5,988,767
DATED       : November 23, 1999
INVENTOR(S) : T. INOUE, et al.

It is certified that error appears in the above-indentified patent and that said Letters Patent is hereby corrected as shown below:

On the title Page:
The following information is added:

[30]   Foreign Application Priority Data

July 25, 1996     [JP]    Japan.......................... 8-196495

Signed and Sealed this

Twenty-seventh Day of March, 2001

Attest:

NICHOLAS P. GODICI

*Attesting Officer*   *Acting Director of the United States Patent and Trademark Office*